(12) United States Patent
Ren et al.

(10) Patent No.: US 10,397,069 B2
(45) Date of Patent: Aug. 27, 2019

(54) SELF-ADAPTIVE SERVICE MANAGEMENT METHOD AND SYSTEM THEREOF

(71) Applicant: WANGSU SCIENCE & TECHNOLOGY CO., LTD., Shanghai (CN)

(72) Inventors: Xiaowei Ren, Shanghai (CN); Liang Chen, Shanghai (CN); Gengxin Lin, Shanghai (CN); Hongqi Lin, Shanghai (CN); Kunshan Li, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 217 days.

(21) Appl. No.: 15/560,327

(22) PCT Filed: Feb. 21, 2017

(86) PCT No.: PCT/CN2017/074218
§ 371 (c)(1),
(2) Date: Sep. 21, 2017

(87) PCT Pub. No.: WO2018/129788
PCT Pub. Date: Jul. 19, 2018

(65) Prior Publication Data
US 2018/0254960 A1    Sep. 6, 2018

(30) Foreign Application Priority Data

Jan. 15, 2017    (CN) .......................... 2017 1 0026974

(51) Int. Cl.
*G06F 15/173*    (2006.01)
*H04L 12/24*    (2006.01)
(Continued)

(52) U.S. Cl.
CPC ...... *H04L 41/5041* (2013.01); *H04L 41/0876* (2013.01); *H04L 61/3005* (2013.01);
(Continued)

(58) Field of Classification Search
CPC ............. H04L 41/5041; H04L 41/0876; H04L 61/3005; H04L 65/4084; H04L 67/1031; H04L 67/28; H04L 67/2814
See application file for complete search history.

(56) References Cited

U.S. PATENT DOCUMENTS

| | | | | |
|---|---|---|---|---|
| 7,339,104 B2 * | 3/2008 | Oshiyama | ........ | G11B 20/00086 84/602 |
| 2010/0235922 A1 * | 9/2010 | Tsusaka | .............. | G06F 21/6245 726/26 |
| 2015/0089346 A1 * | 3/2015 | Ye | .......................... | G06F 16/243 715/226 |

* cited by examiner

*Primary Examiner* — Thanh T Nguyen
(74) *Attorney, Agent, or Firm* — Anova Law Group, PLLC

(57) ABSTRACT

A self-adaptive management method and system thereof are provided. The method includes: sending, by a target AMA server based on pre-stored address information of at least one AMF server, first detection information to the at least one AMF server; receiving, by the at least one AMF server, the first detection information, and returning, by the at least one AMF server, first detection response corresponding to the first detection information to the target AMA server; receiving, by the target AMA server, the first detection response, selecting, by the target AMA server, a target AMF server from the at least one AMF server, and sending, by the target AMA server, a join request to the target AMF server; receiving, by the target AMF server, the join request, and adding, by the target AMF server, the target AMA server to a network node corresponding to the target AMF server.

14 Claims, 8 Drawing Sheets

(51) Int. Cl.
*H04L 29/06* (2006.01)
*H04L 29/12* (2006.01)
*H04L 29/08* (2006.01)
*H04L 12/26* (2006.01)

(52) U.S. Cl.
CPC ...... *H04L 65/4084* (2013.01); *H04L 67/1031* (2013.01); *H04L 67/28* (2013.01); *H04L 67/2814* (2013.01); *H04L 43/10* (2013.01); *H04L 61/2007* (2013.01)

SELF-ADAPTIVE SERVICE MANAGEMENT METHOD AND SYSTEM THEREOF

CROSS-REFERENCES TO RELATED APPLICATIONS

This application is a national phase entry under 35 U.S.C § 371 of International Application No. PCT/CN2017/074218, filed on Feb. 21, 2017, which claims priority of Chinese Patent Application No. 201710026974.0, filed with the State Intellectual Property Office of P. R. China on Jan. 15, 2017, the entire contents of all of which are incorporated herein by reference.

FIELD OF THE DISCLOSURE

The present disclosure relates to the field of content delivery network and, more particularly, relates to a self-adaptive service management method and system thereof.

BACKGROUND

The internet service continues to grow explosively, and for a back end server corresponding to the service provider-side, the number of back-end servers shows a continuous and explosive increase. More specifically, regarding a specific internet service, only a small portion of clients need to be served in the early stage of its birth. But, as the amount of clients increases, the number of original back-end servers often fails to satisfy the new demands, and by then, the service provider-side often deals with such a situation by adding new back-end servers.

However, in the content delivery network, the management of back-end servers is often realized by performing centralized scheduling through node servers, and as the number of back-end servers increases continuously, the management work of the node servers becomes difficult. Further, the service management of the node servers also becomes more and more difficult.

The following drawbacks can be found in the existing management work:

(1) The centralized management undesired for dynamic expansion of the node servers.

(2) The service cannot be loaded or unloaded dynamically, and related data often needs to be configured manually.

(3) Globally consistent resource control is lacking, and resources for priority service are often occupied.

BRIEF SUMMARY OF THE DISCLOSURE

To solve existing issues, embodiments of the present disclosure provides a self-adaptive service management method and system thereof. The technical solutions are as follows:

In the first aspect, a self-adaptive service management method is provided, the method comprises:

Sending, by a target autonomous management agent (AMA) server based on pre-stored address information of at least one autonomous management framework (AMF) server, first detection information to the at least one AMF server;

Receiving, by the at least one AMF server, the first detection information sent by the target AMA server, and returning, by the at least one AMF server, first detection response corresponding to the first detection information to the target AMA server;

Receiving, by the target AMA server, the first detection response returned by the at least one AMF server, selecting, by the target AMA server, a target AMF server from the at least one AMF server, and sending, by the target AMA server, a join request to the target AMF server; and Receiving, by the target AMF server, the join request sent by the target AMA server, and adding, by the target AMF server, the target AMA server to a network node corresponding to the target AMF server.

Optionally, after receiving, by the at least one AMF server, the first detection information sent by the target AMA server, the method further comprises:

If the at least one AMF server and the target AMF server are located in the same network node or the target AMA server owns an external network protocol IP address, the at least one AMF server sends second detection information to the target AMA server;

Receiving, by the target AMA server, the second detection information sent by the at least one AMF server, and sending, by the target AMA server, second detection response to the at least one AMF server;

Selecting the target AMF server from the at least one AMF server comprises:

Among the at least one AMF server corresponding to the received second detection information, selecting the target AMF server.

Optionally, the method further comprises:

For each AMF server in the at least one AMF server, calculating, by the target AMA server, a difference in time between a moment that the first detection information is sent to the AMF server and a moment that the first detection response returned by the AMF server is received;

Selecting the target AMF server comprises:

Selecting an AMF server with a minimum difference in time as the target AMF server.

Optionally, the method further comprises:

Receiving, by the target AMA server, a service process registration request sent by the service provider-side, where the service process registration request carries registration information, and the registration information includes at least a service identifier, a service port identifier, a service process identifier, and a service notification method; and Detecting, by the target AMA server based on the registration information, whether the service process registration request is valid, if yes, the service process registration request is allowed, and if not, registration error information is sent to the service provider-side.

Optionally, the method further comprises:

Receiving, by the target AMA server, a service process cancellation request sent by the service provider-side, where the service process cancellation request carries cancellation information, and the cancellation information includes at least a service identifier, a service port identifier, a service process identifier, and a service notification method;

Detecting, by the target AMA server based on the cancellation information, whether the service process cancellation request is valid, if yes, the service process cancellation request is allowed, and if not, cancellation error information is sent to the service provider-side.

Optionally, the method further comprises:

If a heartbeat signal of the target service process is not received in a preset period of time, cancelling, by the target AMA server, the target service process.

Optionally, the method further comprises:

Receiving, by the target AMF server, a task request sent by the service requester-side, where the task request carries identification information of the target AMA server;

Forwarding, by the target AMF server, the task request to the target AMA server;

Determining, by the target AMA server based on a correspondence relationship between a pre-stored service identifier and a server port identifier, a target service port identifier corresponding to a target service identifier;

Sending, by the target AMA server, the task request to the target service provider-side corresponding to the target service port identifier;

Receiving, by the target AMA server, a task request feedback sent by the target service provider-side, and sending, by the target AMA server, the task request feedback to the target AMF server; and Receiving, by the target AMF server, the task request feedback sent by the target AMA server, and sending, by the target AMF server, the task request feedback to the service requester-side.

Optionally, sending, by the target AMA server, the task request to the target service provider-side corresponding to the target service port identifier comprises:

Determining, by the target AMA server based on the target service port identifier, the target service provider, and acquiring, by the target AMA server, a service notification method corresponding to the target service provider-side; and If the service notification method corresponding to the target service provider-side is network notification ("net_notify"), the target AMA server sends the task request to the target service provider-side; if the service notification method corresponding to the target service provider-side is file notification ("file_notify"), the target AMA server stores the task request and sends a storage address to the target service provider-side; if the service notification method corresponding to the target service provider-side is a file, the target AMA server stores the task request.

In a second aspect, a self-adaptive service management system is provided. The system comprises a target autonomous management agent (AMA) server, and at least one autonomous management framework (AMF) server. The at least one AMF server comprises a target AMF server, where:

The target AMA server is configured to, based on pre-stored address information of at least one autonomous management framework (AMF) server, send first detection information to the at least one AMF server;

The at least one AMF server is configured to, receive the first detection information sent by the target AMA server, and return first detection response of the first detection information to the target AMA server;

The target AMA server is further configured to, receive the first detection response returned by the at least one AMF server, select the target AMF server from the at least one AMF server, and send a join request to the target AMF server; and The target AMF server is configured to receive the join request sent by the target AMA server, and add the target AMA server to a network node corresponding to the target AMF server.

Optionally, the at least one AMF server is further configured to:

If the at least one AMF server and the target AMF server are in the same network node or the target AMA server owns an external network IP address, send second detection information to the target AMA server;

The target AMA server is further configured to receive the second prove information sent by the at least one AMF server, and send second detection response to the at least one AMF server.

The target AMA server is specifically configured to:

Among at least one AMF server corresponding to the received second detection information, select the target AMF server.

Optionally, the target AMA server is further configured to:

For each AMF server in the at least one AMF server, calculate a difference in time between a moment that the first detection information is sent to the AMF server and a moment that the first detection response returned by the AMF server is received;

The target AMA server is specifically configured to:

Selecting an AMF server with a minimum difference in time as the target AMF server.

Optionally, the target AMA server is further configured to receive a service process registration request sent by the service provider-side, where the service process registration request carrying registration information, and the registration information includes at least a service identifier, a service port identifier, a service process identifier, and a service notification method;

The target AMA server is further configured to, based on the registration information, detect whether the service process registration request is valid, if yes, the service process registration request is allowed, and if not, registration error information is sent to the service provider-side.

Optionally, the target AMA server is further configured to receive a service process cancellation request sent by the service provider-side, the service process cancellation request carries cancellation information, where the cancellation information includes at least a service identifier, a service port identifier, a service process identifier, and a service notification method;

The target AMA server is further configured to, based on the cancellation information, detect whether the service process cancellation request is valid, if yes, the service process cancellation request is allowed, and if not, cancellation error information is sent to the service provider-side.

Optionally, the target AMA server is further configured to, if a heartbeat signal of the target service process is not received in a preset period of time, cancel the target service process.

Optionally, the target AMF server is further configured to receive a task request sent by the service requester-side, where the task request carries identification information of the target AMA server;

The target AMA server is further configured to forward the task request to the target AMA server;

The target AMA server is further configured to, based on a correspondence relationship between a pre-stored service identifier and a server port identifier, determine a target service port identifier corresponding to the target service identifier;

The target AMA server is further configured to send the task request to the target service provider-side corresponding to the target service port identifier;

The target AMA server is further configured to receive a task request feedback sent by the target service provider-side and send the task request feedback to the target AMF server;

The target AMA server is further configured to receive the task request feedback sent by the target AMA server and send the task request feedback to the service requester-side;

Optionally, the target AMA server is specifically configured to:

Determine the target service provider-side based on the target service port identifier, and acquire a service notification method corresponding to the target service provider-side;

If the service notification method corresponding to the target service provider-side is network notification ("net_notify"), the task request is sent to the target service provider-side; if the service notification method corresponding to the target service provider-side is file notification ("file_notify"), the task request is stored and a storage address is sent to the target service provider-side; if the service notification method corresponding to the target service provider-side is a file, the task request is stored.

The advantageous effects brought in by technical solutions provided by embodiments of the present disclosure are as follows.

In embodiments of the present disclosure, an LAM system is proposed, and such system may implement the following technical effects:

(1) Dynamic affiliation of the AMA server is realized via a self-adaptive mechanism, and manual addition of the AMA server is avoided;

(2) A "plug-in" method is applied to allow the service process dynamic registration and a plurality of cancellation methods, thereby avoiding the issue of disabling of all service processes caused by termination of a single service process.

(3) A plurality of service access methods are supported, thereby satisfying different service volumes and different real-time service demands.

(4) A globally consistent resource management mechanism is applied to realize appropriate allocation of resources and avoid resources of important service being occupied.

BRIEF DESCRIPTION OF THE DRAWINGS

To more clearly illustrate technical solutions in embodiments of the present disclosure, the accompanying drawings used for describing the embodiments are briefly introduced hereinafter. Obviously, the accompanying drawings in the following descriptions are only some embodiments of the present disclosure, and for those ordinarily skilled in the relevant art, other drawings may be obtained according to the accompanying drawings without creative labor.

DETAILED DESCRIPTION

To make the objective, technical solutions and advantages of the present disclosure more apparent, implementation methods of the present disclosure will be described more fully hereinafter with reference to the accompanying drawings.

Figure 1:
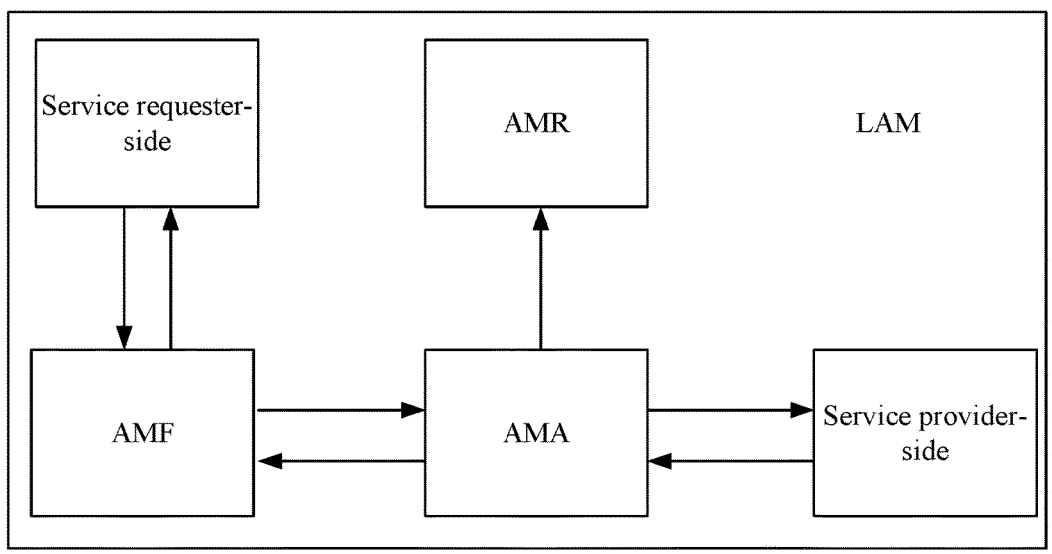
FIG. 1 illustrates a schematic block diagram of an LAM system according to embodiments of the present disclosure.

Embodiments of the present disclosure provides a self-adaptive service management method. The method may be applied to a self-adaptive service management system of a content delivery network. The self-adaptive service management system may also be called a local autonomous manager (LAM) system. As shown in FIG. 1, the system includes at least one network node. A network node is often a single machine room, or a plurality of machine rooms. Each network node corresponds to one autonomous management framework (AMF) server that is also called a management server, and at least one autonomous management agent (AMA) server that is also called a node server. The AMF server is configured to manage all AMA servers in each node, and simultaneously, receive a task request sent by the task requester-side (also considered as a client). The AMA server is configured to process service related to the service provider, such as the registration and cancellation of the service, survival detection and hardware resource management of the service, and task request forwarded to the service provider. The service provider provides specific servers for the service provider-side. The servers that satisfy the access conditions may all access the LAM system via the AMA server, and the AMA server is responsible for parsing the domain name address of the AMF server to specific internet protocol (IP) address for the AMA server to detect.

Figure 2:
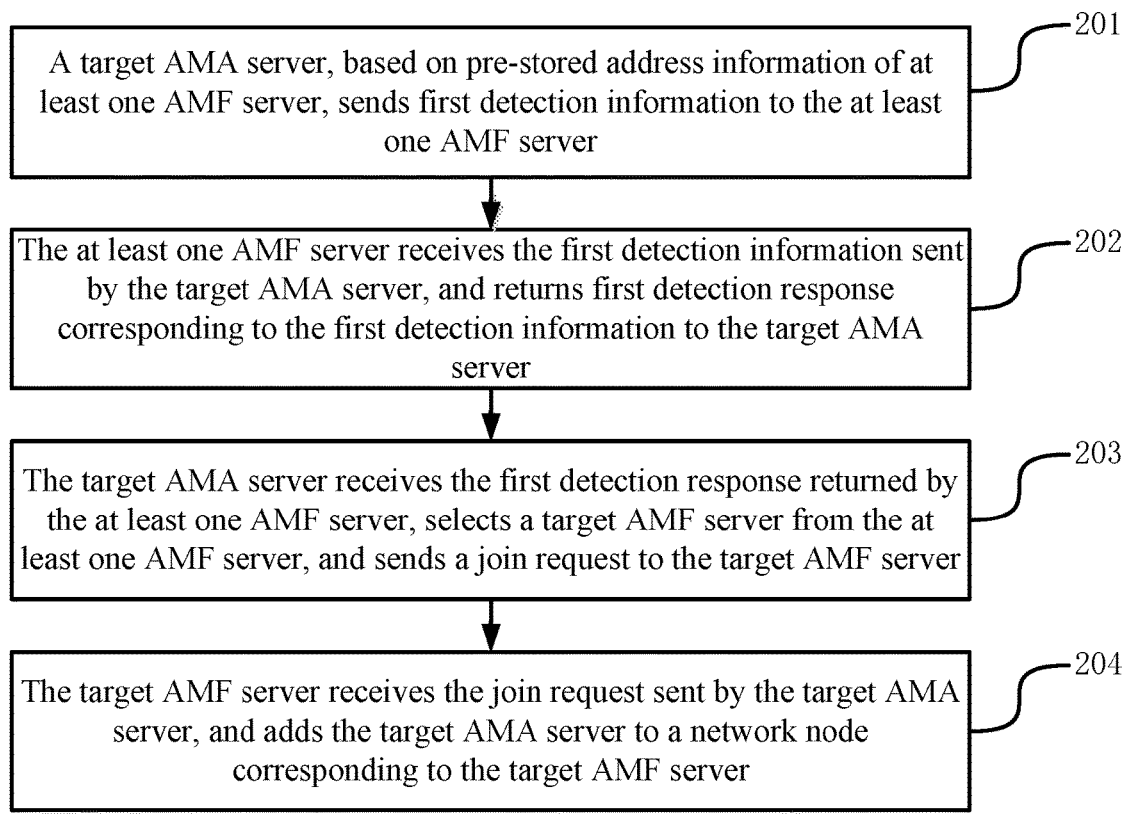
FIG. 2 illustrates a method flow chart for self-adaptive service management according to embodiments of the present disclosure.

The processing flow chart shown in FIG. 2 is illustrated in detail hereinafter with reference to specific embodiments, and the content may be as follows:

Step 201, sending, by a target autonomous management agent (AMA) server based on pre-stored address information of at least one autonomous management framework (AMF) server, first detection information to the at least one AMF server;

In implementation, an AMA server that has not joined any AMF server may be called a free AMA server, and the free AMA server joins an AMF server via self-adaptive detection mechanism. The free AMA server may be called a target AMA server, and address information of at least one AMF server may be pre-stored in the target AMA server. Further, the target AMA server may mark the beginning of the detection progress, and configure the time-out period (e.g., 5 seconds). At approximately the same time, the target AMA server initiates connection to at least one AMF server based on the aforementioned address information, and send out a detection packet (i.e., first detection information). The ID of such packet is denoted as ID1.

Step 202, receiving, by the at least one AMF server, the first detection information sent by the target AMA server, and returning, by the at least one AMF server, first detection response corresponding to the first detection information to the target AMA server.

In implementation, a part of AMF servers (i.e., at least one AMF servers) in the LAM system may receive the first detection information sent by the target AMA server and further return the first detection response corresponding to the first detection information to the target AMA server.

Step 203, receiving, by the target AMA server, the first detection response returned by the at least one AMF server, selecting, by the target AMA server, a target AMF server from the at least one AMF server, and sending, by the target AMA server, a join request to the target AMF server.

In implementation, after receiving the first detection response returned by the at least one AMA server, the target AMA server may select a to-be-joining AMF server (i.e., the target AMF server) from the aforementioned AMA server based on the first detection response, and label the end of the detection progress, such that the target AMA server may send a join request to the target AMF server.

Step 204, receiving, by the target AMF server, the join request sent by the target AMA server, and adding, by the target AMF server, the target AMA server to a network node corresponding to the target AMF server.

In implementation, after receiving the join request sent by the target AMA server, the target AMF server may add the target AMA server to the network node corresponding to the target AMF server.

Optionally, the processing in the aforementioned Step 201 to Step 204 may be called one-way detection, and the detection mechanism may also include two-way detection. Correspondingly, the following processing may be included after Step 202: if the at least one AMF server and the target AMF server are located at the same network node or the target AMA server owns an external network protocol IP address, the at least one AMF server sends second detection information to the target AMA server. The target AMA server receives the second detection information sent by the at least one AMF server, and sends second detection response to the at least one AMF server.

In implementation, after sending a detection response corresponding to detection information to the target AMA server, the at least one AMF server may determine, based on a network address of the target AMA server, a network node that the target AMA server is in. If the AMF server and the target AMF server are located in the same network node or the target AMA server owns an external network protocol IP address, the AMF server may send second detection information to the target AMA server. The target AMA server receives the second detection information sent by the at least one AMF server, and sends the second detection response to the at least one AMF server, such that the aforementioned at least one AMF server may receive the second detection response sent by the target AMA server. As such, two-way detection is thus fulfilled. It should be noted that, when the AMA server chooses the to-be-joining AMF server, the priority of two-way detection result is higher than that of the one-way detection. That is, the AMA server always prefers to join an AMF server that shows successful two-way detection. Accordingly, the corresponding selection processing may be as follows: a target AMF server is selected from the at least one AMF server corresponding to the received second detection information. That is, the target AMA server may prefer to select the target AMF server from all AMF servers corresponding to the received second detection information.

Optionally, the target AMA server may select the target AMF server based on the response rate of each AMF server. Correspondingly, the processing in Step 204 may be as follows: for each AMF server in the at least one AMF server, the target AMA server calculates a difference in time between a moment that the first detection information is sent to the AMF server and a moment that the first detection response returned by the AMF server is received, and the AMF server with a minimum difference in time is selected as the target AMF server.

In implementation, when the target AMA server sends the first detection information to the at least one AMF server, timing may be started. Further, every time a first detection response fed back by an AMF server is received, the probing period corresponding to the AMF server is recorded. Further, the AMF server with the shortest probing period may be selected as the target AMF server. As such, the AMF server providing the best network quality in between with the target AMA server may be selected out.

Optionally, the present solution further provides a processing where the service provider-side registers service process in the AMA server, and the corresponding processing may be as follows: receiving, by the target AMA server, a service process registration request sent by the service provider-side, where the service process registration request carries registration information, and the registration information includes at least a service identifier, a service port identifier, a service process identifier, and a service notification method; detecting, by the target AMA server based on the registration information, whether the service process registration request is valid, if yes, the service process registration request is allowed, and if not, registration error information is sent to the service provider-side.

In implementation, the LAM system supports the target AMA server to perform dynamic plug-in management of different local services. "Dynamic" refers to a situation where the Lam system has no idea which service provider-side may perform service process registration in advance. "Plug-in" refers to a situation where the registration or cancellation of the service process has no influence on the functions of other LAM systems, such as the service process registration of the service provider-side, service process survival detection, service process cancellation, service resource control, and service data push, etc. For the service provider-side to perform service process registration on the target AMA server, the following conditions may need to be satisfied: the service must a service supported by the target AMA server, the service must be registered using process as the unit, and the registered port needs to support HTTP protocol.

The process of service process registration may be as follows: the service provider-side is first connected to the target AMA server, and the service provider-side may send the service process registration request to the target AMA server, where the registration information includes: service identifier, service port identifier, service process ID, and service notification method. In particular, the service identifier is configured to perform comparison with respect to the service name in the aforementioned task request, and the "service port identifier" is a target port where the task request is sent to, namely, a service port. The "service port identifier" and the "service process ID" are simultaneously configured to judge the validity of the service process, and the "service notification method" is a method that the target AMA server sends the task request to the service provider-side. Further, the target AMA server may check the validity of the service process registration request, including: whether the service port and the service process ID are matched, and whether the service process ID survives or not, etc. Once validation is successful, the AMA server may synchronize the aforementioned registration information to the LAM system, and return the registration result to the service provider-side; otherwise, the error information is returned.

It is worth mentioning that, after the service process registration is completed, registration information may still need to be sent to the target AMA server, and by then, the target AMA server may automatically treat the registration information as a heartbeat signal. If the heartbeat signal of the service process continues to be missing and reaches an upper limit (e.g., 5 times), such service process may be automatically cancelled. That is, if the heartbeat signal of the target service process is not received in a preset period of time, the target AMA server may cancel the target service.

More specifically: if the service process exits by accident such that active cancellation may not be timely completed or the service logic is abnormal such that the progress is dead, the automatic cancellation logic may be triggered. When the target AMA server does not receive the heartbeat signal of the target service process in a preset period of time, the target AMA server may determine whether the service process is alive or not. If the service process is still alive, a warning is triggered (the situation where the service process survives but the heartbeat is lost means that the service got stuck), and no matter whether the service process is alive or not, the registration information corresponding to the service process is deleted.

After the service process registration is completed, the target AMA server performs resource management, including control of CPU core numbers and control of memory usage times. The service process accessing the LAM system may show difference regarding the importance, and important task progress may need to be ensured to have more hardware resources. Accordingly, in the aspect of hardware, a method of supervisory setting may be applied for implementation.

Figure 3:
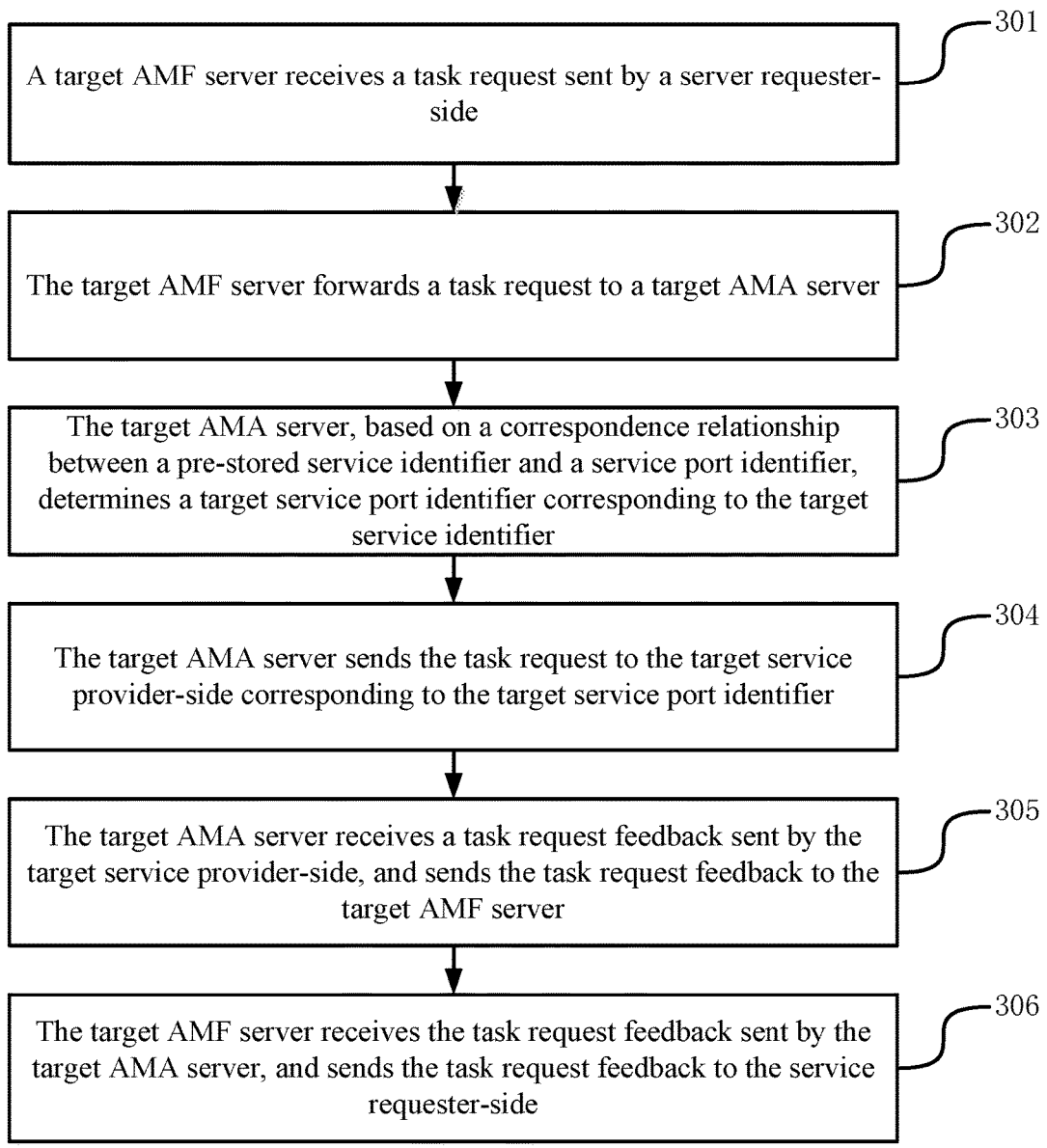
FIG. 3 illustrates a method flow chart for processing a task request according to embodiments of the present disclosure.

Optionally, the present disclosure also provides a processing flow of processing the task request sent by the service requester-side after the service completes registration, and the corresponding processing may be illustrated in FIG. 3:

Step 301, receiving, by the target AMF server, the task request sent by the service requester-side, where a target AMA server identifier is carried in the task request.

In particular, the AMA server identifier may be an identification (ID) of the AMA server.

In implementation, the service requester-side may perform communication connection with a certain AMF server (i.e., the target AMF server) in the LAM system. When the service requester-side needs to acquire a certain type of service provided by the service provider-side, a task request corresponding to such service may be sent to the target AMF server. Simultaneously, the service requester-side may designate at least one AMA server (e.g., the target AMA server) to process the current task request. As such, the task request may carry the target AMA server identifier.

Step 302, forwarding, by the target AMF server, the task request to the target AMA server.

In implementation, after receiving the task request sent by the service requester-side, the target AMF server may acquire the target AMA server identifier carried therein, and forward the aforementioned task request to the target AMA server. If the task request carries an attachment, the target AMF server may randomly select an AMA server in a corresponding network node as a main AMA server, and further send the task request to the AMA server for pre-downloading and temporarily storing the task request in a cache machine inside the node, thereby accelerating the downloading progress of other AMA servers. If the task request needs timely feedback, the target AMF server may configure the timer with timing feedback and set the current time as the beginning of timing. If the target AMF server does not determine a corresponding target AMA server, an error code is returned to the service requester-side.

Step 303, determining, by the target AMA server based on a correspondence relationship between a pre-stored service identifier and a server port identifier, a target service port identifier corresponding to the target service identifier.

In particular, the service identifier may be a service name, and the service port identifier may be the ID of the service port.

In implementation, after acquiring the target service identifier, the target AMA server may, in the correspondence relationship between the pre-stored service identifier and the service port identifier, search for the target service port identifier corresponding to the target service identifier. Here, the aforementioned correspondence relationship may be recorded by the target AMA server when the target service provider-side registers in the target AMA server. Further, if the target AMA server does not find the target service port identifier corresponding to the target service identifier, the error code may be returned.

Step 304, sending, by the target AMA server, the task request to the target service provider-side corresponding to the target service port identifier.

In implementation, after determining the target service port identifier, the target AMA server may send the task request to the target service provider-side corresponding to the target service port identifier.

Optionally, the target AMA server may, according to the service notification method corresponding to the target service provider-side, select different methods to send the task request. Correspondingly, the processing of Step 304 may be as follows: acquiring, by the target AMA server, a service notification method corresponding to the target service provider-side based on the target service port identifier. If the service notification method corresponding to the target service provider-side is net_notify, the target AMA server sends the task request to the target service provider-side. If the service notification method corresponding to the target service provider-side is file_notify, the target AMA server stores the task request and sends the stored address to the target service provider-side. If the service notification method corresponding to the target service provider-side is a file, the target AMA server stores the task request.

In implementation, after determining the target service port identifier, the target AMA server may determine the target service provider-side based on the target service port identifier, and acquire the service notification method corresponding to the target service provider-side. Here, the service notification method corresponding to the target service provider-side may recorded by the target AMA server when the target service provider-side is registered in the target AMA server. In particular, the target AMA server supports three different types of service notification methods to adjust to different service demands, including: net_notify (network notification), where the target AMA server directly sends the task request to the target service provider-side, which is suitable for services with a small and frequent data amount. The specific steps may include connecting the target AMA server directly to the target service port, sending a task request to the target service provider-side, and responding, by the target service provider-side. The service notification method further includes file_notify (file notification), where the target AMA server writes the task request into a disc and later notify the target service provider-side, which is suitable for service with a large data amount and requires high instantaneity, and the specific steps are: saving, by the target AMA server, the task request in the disc, connecting the target AMA server to the target service port, sending a storage path to the target service provider-side, and responding, by the target service provider-side. The service notification method further include a file, where an end is told when the AMA server writes the task request into the disc, which is suitable for services with a large data amount and requires no high instantaneity.

Step 305, receiving, by the target AMA server, a task request feedback sent by the target service provider-side, and sending, by the target AMA server, the task request feedback to the target AMF server.

In implementation, after the target AMA server sends the task request to the target service provider-side, the target service provider-side may perform feedback for the task request. Accordingly, the target AMA server may receive the task request feedback sent by the target service provider-side, and then send the task request feedback to the target AMF server.

Step 306, receiving, by the target AMF server, the task request feedback sent by the target AMA server, and sending, by the target AMF server, the task request feedback to the service requester-side.

In implementation, the target AMF server may receive the task request feedback sent by at least one target AMA server, gather each task request feedback, and feedback a result to the task requester-side. If the task request needs timing feedback, by then the timing feedback may be closed.

Figure 4:
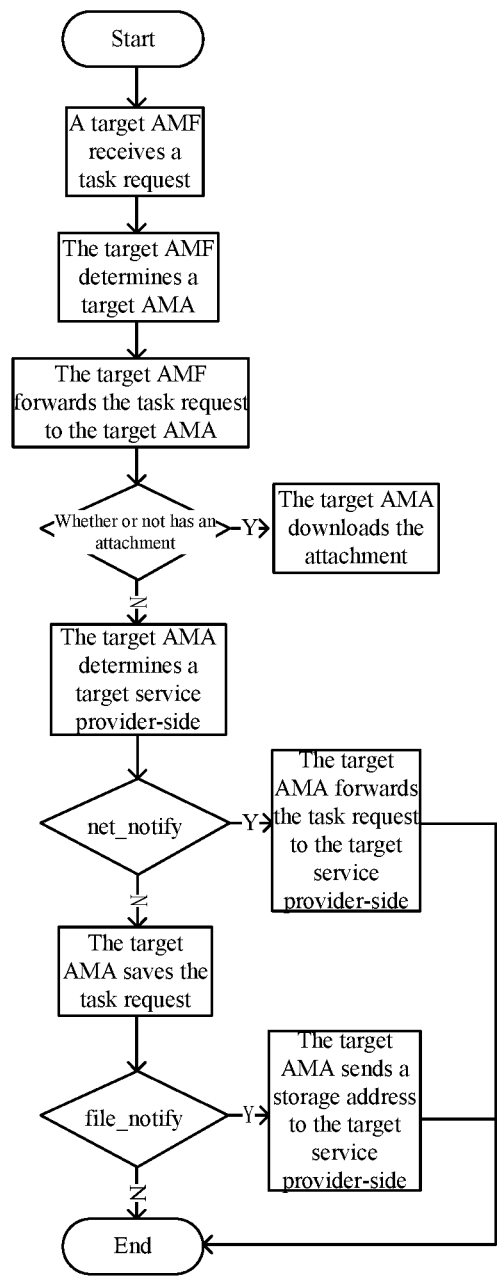
FIG. 4 illustrates a logic flow chart for processing a task request according to embodiments of the present disclosure.

FIG. 4 is a simple logic flow chart corresponding to aforementioned Steps 301 to 306.

Optionally, the present solution further provides processing of active cancellation service for a service provider-side on the AMA server, and the corresponding processing may be as follows: receiving, by the target AMA server, a service process cancellation request sent by the service provider-side, the service process cancellation request carries cancellation information, where the cancellation information includes at least service identifier, service port identifier, service process identifier, and service notification method; detecting, by the target AMA server based on the cancellation information, whether the service process cancellation request is valid or not, if yes, the service process cancellation request is allowed; if no, a cancellation error information is sent to the service provider-side.

In implementation, the service provider may actively send the service process cancellation request to the AMA server, such cancellation request is active cancellation, and active cancellation needs to satisfy the following conditions: the cancelled service process needs to be a service process supported by the target AMA server, and cancellation needs to be performed using the progress as the unit. The active cancellation progress of the service provider-side may be as follows: connecting the service provider-side to the target AMA server, and sending the service process cancellation request to the target AMA server, the content includes: service identifier, service port identifier, and service process identifier. The target AMA server may detect the validity of the service process cancellation request, including: whether the service port matches the service process ID, whether the service process ID is alive, etc. If being valid, the target AMA server may delete registration information of the service process from the LAM system, and return the cancellation result to the service provider-side.

In embodiments of the present disclosure, an LAM system is proposed, and such system may implement the following technical effects:

(1) Dynamic affiliation of the AMA server is realized via a self-adaptive mechanism, and manual addition of the AMA server is avoided;

(2) A "plug-in" method is applied to allow the service process dynamic registration and a plurality of cancellation methods, thereby avoiding the issue of disabling of all service processes caused by termination of a single service process;

(3) A plurality of service access methods are supported, thereby satisfying different service volumes and different real-time service demands.

(4) A globally consistent resource management mechanism is applied to realize appropriate allocation of resources and avoid resources of important service being occupied.

Figure 5:
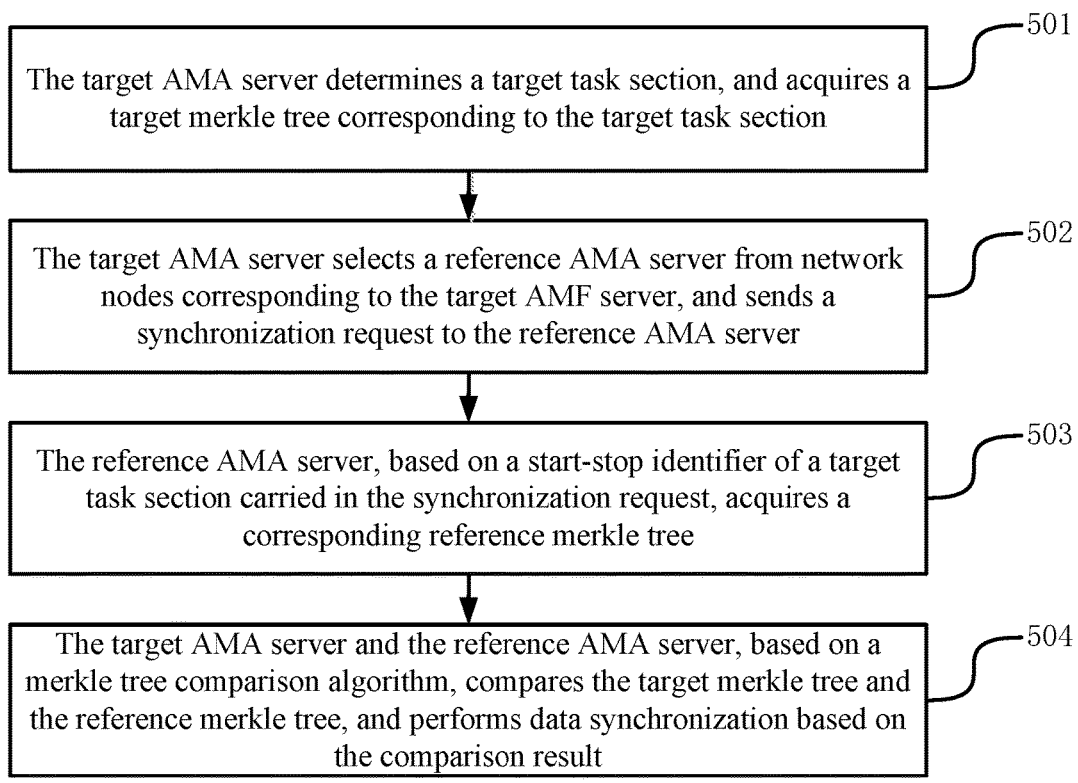
FIG. 5 illustrates a method flow chart for task data synchronization according to embodiments of the present disclosure.

Embodiments of the present disclosure further provides a data synchronization method. The method may be applied to a self-adaptive service management system of the aforementioned content delivery network. Hereinafter, the processing flow shown in FIG. 5 is illustrated in detail hereinafter with reference to specific implementation methods, and the content is as follows:

Step 501: A target AMA server determines a target task section, and acquires a target merkle tree corresponding to the target task section, where the bottom-layer node of the target merkle tree is a task ID.

In implementation, when the LAM system receives a task request sent by the service requester-side, the AMF server connected to the service requester-side may assign a task ID for the task request. In particular, task IDs of a plurality of task requests may be continuous, each task ID is unique and non-repeating, and the format of the task ID may be: TaskID001, TaskID002, TaskID003, etc. The AMF server may send the task request to all AMA servers managed by the AMF server. After receiving the task request, the AMA server may save all content of the task request in a database, and save the task ID in a form of merkle tree in the disc. The merkle tree may be a complete binary tree, and the node data of the bottom-layer nodes of the merkle tree is a stored task ID or represents a None value that is not stored. The node data of the rest each node is obtained by calculating node data of the next layer of nodes based on a preset computational rule. To reduce the occupation of disc and memory, the maximum layer of each Merkle Tree may be 15, and the total number of task IDs saved by each merkle tree does not exceed $2^{15-1}$, namely, 16384. When the total number of task exceeds $2^{15-1}$, the task ID may be stored in the form of sub-merkle tree and parent-merkle tree. That is, the node data of the bottom-layer node of the sub-merkle tree is the task ID or represents the None value that is not stored, and the node data of the top-layer node of the sub-merkle tree is the node data of the bottom-layer node of the parent merkle tree. The maximum layer of the parent-merkle tree may also be 15, such that one parent merkle tree may record $2^{15-1} \times 2^{15-1}$ task IDs. When the AMA server receives a new task request, the task ID of the new task request may be stored in a corresponding position of the merkle tree, that is, the None value is covered. The AMF server may divide uniform task section for all the AMA servers managed by the AMF server, the size and number of the task section may be designated by the AMF server, and timing roll-back may be supported. For example, when the size of the task section is 10 and the number of the task sections is 3, the task sections may be [TaskID000, TaskID009], [TaskID010, TaskID019], and [TaskID020, TaskID029], respectively; if the task TaskID030 arrives, the task sections may become [TaskID010, TaskID019], [TaskID020, TaskID029], [TaskID030, TaskID039], and the task section [TaskID000, TaskID009] may be deleted.

The AMA server and other AMA servers in the same network node may perform data synchronization periodically. That is, the task data may be synchronized. When a certain AMA server (i.e., the target AMA server) needs to initiate data synchronization, the task section (i.e., the target task section) that needs to be synchronized at the current time may be determined first. Further, the target merkle tree corresponding to the target task section stored locally may be acquired. If the number of task IDs included in the target task section is greater than $2^{15-1}$, a plurality of target sub-merkle trees are obtained. Further, the target AMA server may generate a target parent merkle tree based on the plurality of target sub-merle trees. As such, the follow-up processing may all be considered to be performed towards the target parent-merkle tree.

Step 502, the target AMA server selects a reference AMA server in the network nodes corresponding to the target AMF server, and send synchronization request to the reference AMA server, where the synchronization request carries a start-stop identifier of the target task section.

In implementation, the target AMA server may randomly select a reference AMA server from other AMA servers in the network nodes corresponding to the target AMF server as the object of data synchronization. Further, the target AMA server may send a synchronization request to the reference AMA server, and the synchronization request may carry the start-stop identifier of the target task section determined by the target AMA server in Step 501. Such start-stop identifier may be two task ID values at the beginning and end of the target task section.

Step 503, the reference AMA server, based on the start-stop identifier of the target task section carried in the synchronization request, acquires the corresponding reference merkle tree.

In implementation, the reference AMA server receives the synchronization request sent by the target AMA server and acquires the start-stop identifier of the target section carried in the target AMA server. Later, the reference merkle tree corresponding to the stop-start identifier that is stored in the local disc may be acquired. Similarly, if the number of task IDs included in the target task section is greater than $2^{15-1}$, a plurality of reference sub-merkle trees is acquired. Further, the reference AMA server may generate a reference parent-merkle tree based on a plurality of reference sub-merkle trees. As such, the subsequent processing may be considered to be performed on the reference parent-merkle tree.

Step 504, the target AMA server and the reference AMA server, based on the merkle tree comparison algorithm, compare the target merkle tree and the reference merkle tree, and performs data synchronization based on the comparison results.

In implementations, after the target AMA servers and the reference AMA server acquire the target merkle tree and the reference merkle tree, respectively, based on the merkle tree comparison algorithm, whether the node data of the nodes in the same position in the target merkle tree and the reference merkle tree is consistent may be compared, and further, corresponding data synchronization may be performed based on the comparison results. More specifically, the target/reference AMA server may send the node data of the target/reference merkle tree to the each other, such that the reference/target server may compare the node data of the received merkle tree and the node data of the acquired local merkle tree.

Figure 6:
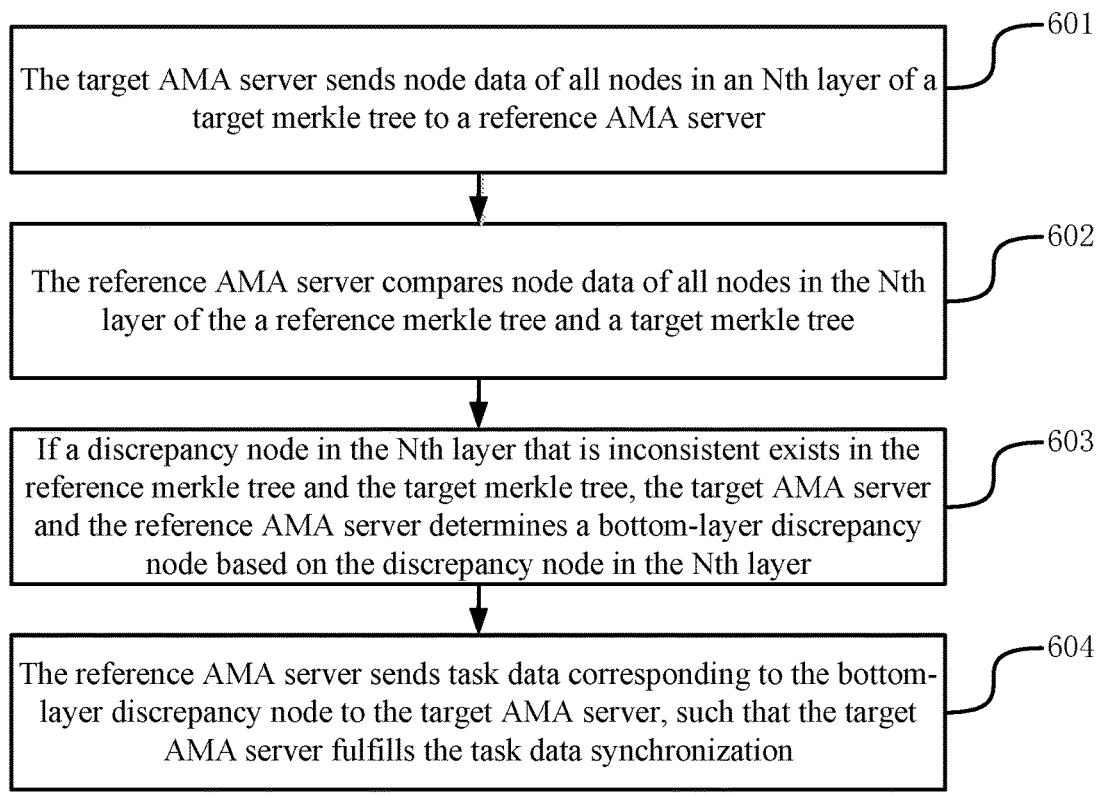
FIG. 6 illustrate a flow chart of a merkle tree comparison algorithm according to embodiments of the present disclosure.

Optionally, the merkle tree comparison algorithm in Step 504 may be illustrated in the flow chart shown in FIG. 6.

Step 601, the target AMA server sends the node data of all nodes in an Nth layer of the target merkle tree to the reference AMA server, where N is an integer greater than 0.

In implementation, after the target AMA server acquires the target merkle tree, all nodes in a certain layer (i.e., an Nth layer, where N is an integer greater than 0) of the target merkle tree may be selected, and the node data of all nodes in the Nth layer may be sent to the reference AMA server.

Step 602, the reference AMA server may compare the node data of all nodes in the Nth layer of the reference merkle tree and of the target merkle tree one by one.

In implementation, the reference AMA server may receive the node data of all nodes in the Nth layer of the target merkle tree sent by the target AMA server. Further, the node data of all nodes in the Nth layer of the reference merkle tree and the node data of all nodes in the Nth layer of the target merkle tree is compared one by one.

Step 603, if an Nth layer discrepancy node that is known as node data inconsistent in the reference merkle tree and the target merkle tree exists, the target AMA server and the reference AMA server may determine the bottom-layer discrepancy node based on the Nth layer discrepancy node.

In implementation, during a comparison process, if node data of the nodes in a certain same position in the reference merkle tree and the target merkle tree is inconsistent, such node may be marked as the discrepancy node. After comparing the node data of all nodes in the Nth layer, the target AMA server and the reference AMA server may determine the bottom-layer discrepancy node based on all the marked Nth layer discrepancy node. It should be noted that, in the present disclosure, in the different merkle trees corresponding to different AMA servers in the network nodes managed by the target AMF server, nodes at the same location may be considered as the same node. Accordingly, if not restricted specifically, when a certain node is processed, nodes in different merkle trees may be processed simultaneously. Thus, the aforementioned processing of "labeling the node as a discrepancy node" may be understood as "simultaneously labeling the corresponding node in the reference merkle tree and the target merkle tree as the discrepancy node".

Step 604, the reference AMA server sends the task data corresponding to the bottom-layer discrepancy node to the target AMA server, such that the target AMA server fulfills task data synchronization.

In implementation, after the bottom-layer discrepancy node is determined, the reference AMA server may acquire the node data of the bottom-layer discrepancy node, namely, the task ID. Further, corresponding task data may be acquired in the local database. Further, the reference AMA server may send the task data corresponding to the bottom-layer discrepancy node to the target AMA server, such that the target AMA server stores the task data, updates the target merkle tree, and fulfills the task data synchronization.

Optionally, if the node data of all nodes in the Nth layer of the reference merkle tree and the target merkle tree is consistent, the reference AMA server may send synchronization cancellation information to the target AMA server.

In implementation, if the node data of all nodes in the Nth layer of the reference merkle tree and the target merkle tree are consistent, the current synchronization may no longer need to be performed. Accordingly, the reference AMA server may send the synchronization cancellation information to the target AMA server, and the current synchronization ends.

Figure 7:
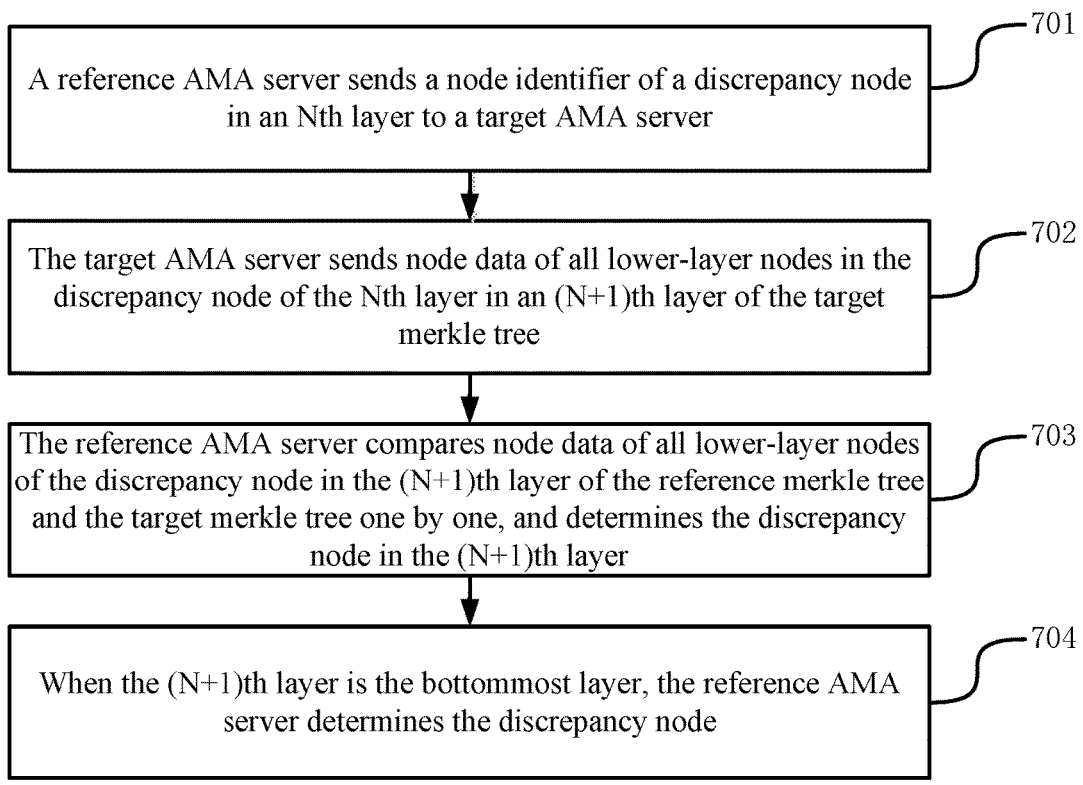
FIG. 7 illustrates a flow chart for determining a bottom-layer discrepancy node according to embodiments of the present disclosure.

Optionally, processing of the target AMA server and the reference AMA server that determines the bottom-layer discrepancy node based on the Nth layer discrepancy node in Step 603 may be illustrated in the flow of FIG. 7.

Step 701, the reference AMA server sends the node identifier of the Nth layer discrepancy node to the target AMA server.

In implementation, after the Nth layer discrepancy node is determined, the reference AMA server may send the node identifier of the Nth layer discrepancy node to the target AMA server, and such node identifier may be the position information of the node, such as the $M^{th}$ node of the $N^{th}$ layer.

Step 702, the target AMA server sends the node data of all lower-layer nodes of the Nth layer discrepancy nodes in the $(N+1)^{th}$ layer of the target merkle tree to the reference AMA server.

In implementation, after the target AMA server receives the node identifier of the Nth layer discrepancy nodes sent by the reference AMA server, the lower-layer nodes of the discrepancy node may be determined based on the node identifier. Further, the node data of all lower-layer nodes of the Nth layer discrepancy node in the $(N+1)^{th}$ layer of the target merkle tree may be sent to the reference AMA server. For example, the target merkle tree may be a complete binary tree, and the discrepancy node may be an $M^{th}$ node in an $N^{th}$ layer, such that all lower-layer nodes of the discrepancy node may be the $(2M-1)^{th}$ node and the $(2M)^{th}$ node in the $(N+1)^{th}$ layer.

Step 703, the reference AMA server compares the node data of all lower-layer nodes of the discrepancy nodes in the (N+1)th layer of the reference merkle tree and the target merkle tree one by one, thereby determining the discrepancy node of the (N+1)th layer.

In implementation, the reference AMA server receives the node data of all lower-layer nodes of the discrepancy node in the $(N+1)^{th}$ layer of the target merkle tree sent by the target AMA server, and may compare the node data of all lower-layer nodes of the discrepancy node in the $(N+1)^{th}$ layer of the reference merkle tree one by one, thereby further determining the discrepancy nodes in the $(N+1)^{th}$ layer that have inconsistent node data.

Step 704, when the $(N+1)^{th}$ layer is the bottommost layer, the reference AMA server determines the discrepancy nodes in the bottom layer.

In implementation, after the discrepancy nodes in the (N+1)th layer is determined, the discrepancy nodes in the lower layer may be determined according to the processing shown in Step 701 to Step 703. As such, when the $(N+1)^{th}$ layer is the bottommost layer of the merkle tree, the discrepancy nodes of the bottom layer may be determined.

Optionally, to prevent too many AMA servers from initiating synchronization request simultaneously that results in a too large bandwidth pressure in the network node, the AMA server needs to determine whether synchronization permission is possessed before the task data is synchronized, and the corresponding processing may be as follows: the target AMA server receives the synchronization count value and the total number of AMA servers sent by the target AMF server, and the target AMA server, based on the synchronization count value, the total number of AMA servers, and the serial number of local machine, whether the synchronization permission is possessed.

In implementation, to ensure the accuracy of the task data of each AMA server, the AMA servers in the same network node need to perform task data synchronization alternately. The AMF server may allocate serial numbers for all AMA servers in the network nodes managed by the AMF server, and simultaneously provide synchronization count value and the total number of AMA servers to all the AMA servers. Accordingly, the target AMA server may receive the synchronization count value and the total number of AMA servers sent by the target AMF server. Here, the processing of the synchronization count value and the total number of AMA servers may be actively acquired from the target AMF server before the target AMA server is about to perform task data synchronization, or may be actively sent by the target AMF server to the target AMA server after the synchronization count value and the total number of AMA servers change. Further, the target AMA server may, based on the synchronization count value, the total number of AMA servers, and the serial number of the local machine, determine whether the synchronization permission is possessed. More specifically, when the equation of "synchronization count value" % "the total number of AMA servers"="the target AMA server serial number", the target AMA server possesses synchronization permission, where "%" is remainder operation. Further, when the current synchronization ends, the target AMA server may send the synchronization complete information to the target AMF server, and the target AMF server may plus the synchronization count value by one.

Figure 8:
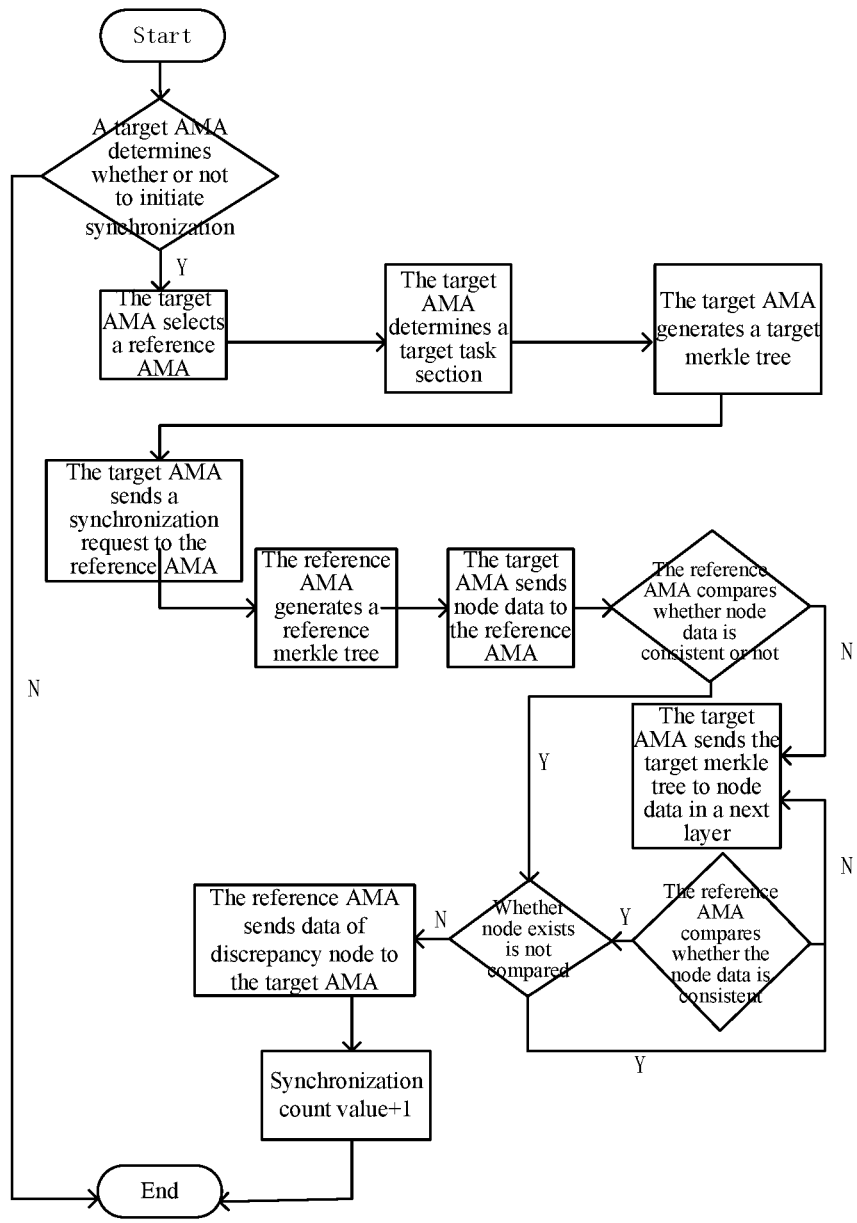
FIG. 8 illustrates a flow chart for task data synchronization according to embodiments of the present disclosure.

FIG. 8 illustrates a flow chart of a feasible task data synchronization.

In embodiments of the present disclosure, the target AMA server determines the target task section, and acquires the target merkle tree corresponding to the target task section, where the bottom-layer node of the target merkle tree is a task ID. The target AMA server selects the reference AMA server from the network nodes corresponding to the target AMF server, and send the synchronization request to the reference AMA server, where the synchronization request carries the start-stop identifier of the target task section. The reference AMA server, based on the start-stop identifier of the target task section carried in the synchronization request, acquires corresponding reference merkle tree. The target AMA server and the reference AMA server, based on the merkle tree comparison algorithm, compare the target merkle tree and the reference merkle tree and perform task data synchronization based on the comparison results. As such, when the target AMA server needs to perform task data synchronization, the task data may be acquired from other AMA servers in the same network node without adding the operation load of the management server.

Embodiments of the present disclosure also provides a self-adaptive service management system. The system includes a target AMA server, and at least one AMF server. The at least one AMF server comprises a target AMF server, where:

The target AMA server is configured to, based on pre-stored address information of at least one autonomous management framework (AMF) server, send first detection information to the at least one AMF server;

The at least one AMF server is configured to, receive the first detection information sent by the target AMA server, and return first detection response of the first detection information to the target AMA server;

The target AMA server is further configured to, receive the first detection response returned by the at least one AMF server, select the target AMF server from the at least one AMF server, and send a join request to the target AMF server;

The target AMF server is configured to receive the join request sent by the target AMA server, and add the target AMA server to a network node corresponding to the target AMF server.

Optionally, the at least one AMF server is further configured to:

If the at least one AMF server and the target AMF server are in the same network node or the target AMA server owns an external network IP address, send second detection information to the target AMA server;

The target AMA server is further configured to receive the second prove information sent by the at least one AMF server, and send second detection response to the at least one AMF server;

The target AMA server is specifically configured to:

Among at least one AMF server corresponding to the received second detection information, select the target AMF server.

Optionally, the target AMA server is further configured to:

For each AMF server in the at least one AMF server, calculate a difference in time between a moment that the first detection information is sent to the AMF server and a moment that the first detection response returned by the AMF server is received;

The target AMA server is specifically configured to:

Selecting an AMF server with a minimum difference in time as the target AMF server.

Optionally, the target AMA server is further configured to receive a service process registration request sent by the service provider-side, where the service process registration request carrying registration information, and the registration information includes at least a service identifier, a service port identifier, a service process identifier, and a service notification method;

The target AMA server is further configured to, based on the registration information, detect whether the service process registration request is valid, if yes, the service process registration request is allowed, and if not, registration error information is sent to the service provider-side.

Optionally, the target AMA server is further configured to receive a service process cancellation request sent by the service provider-side, the service process cancellation request carries cancellation information, where the cancellation information includes at least a service identifier, a service port identifier, a service process identifier, and a service notification method;

The target AMA server is further configured to, based on the cancellation information, detect whether the service process cancellation request is valid, if yes, the service process cancellation request is allowed, and if not, cancellation error information is sent to the service provider-side.

Optionally, the target AMA server is further configured to, if a heartbeat signal of the target service process is not received in a preset period of time, cancel the target service process.

Optionally, the target AMF server is further configured to receive a task request sent by the service requester-side, where the task request carries identification information of the target AMA server;

The target AMF server is further configured to forward the task request to the target AMA server;

The target AMA server is further configured to, based on a correspondence relationship between a pre-stored service identifier and a server port identifier, determine a target service port identifier corresponding to the target service identifier;

The target AMA server is further configured to send the task request to the target service provider-side corresponding to the target service port identifier;

The target AMA server is further configured to receive a task request feedback sent by the target service provider-side and send the task request feedback to the target AMF server;

The target AMA server is further configured to receive the task request feedback sent by the target AMA server and send the task request feedback to the service requester-side;

Optionally, the target AMA server is specifically configured to:

Determine the target service provider-side based on the target service port identifier, and acquire a service notification method corresponding to the target service provider-side;

If the service notification method corresponding to the target service provider-side is net_notify, the task request is sent to the target service provider-side; if the service notification method corresponding to the target service provider-side is "file_notify", the task request is stored and a storage address is sent to the target service provider-side; if the service notification method corresponding to the target service provider-side is a file, the task request is stored.

Those ordinarily skilled in the relevant art may understand that all or a part of steps of the aforementioned embodiments may be realized by hardware, or realized by using a program to instruct related hardware. The aforementioned program may be stored in a computer readable storage medium. The aforementioned storage medium may be read-only storage, disc, or optical disc, etc.

The aforementioned are only preferred embodiments of the present disclosure and are not applied to limit the present disclosure. Any modification, equivalent replacement, and improvement, etc. within the spirit and principle of the present disclosure shall fall within the protection range of the present disclosure.

What is claimed is:

1. A self-adaptive service management method, comprising:

sending, by a target autonomous management agent (AMA) server based on pre-stored address information of at least one autonomous management framework (AMF) server, first detection information to the at least one AMF server;

receiving, by the at least one AMF server, the first detection information sent by the target AMA server, and returning, by the at least one AMF server, first detection response corresponding to the first detection information to the target AMA server;

receiving, by the target AMA server, the first detection response returned by the at least one AMF server, selecting, by the target AMA server, a target AMF server from the at least one AMF server, and sending, by the target AMA server, a join request to the target AMF server;

receiving, by the target AMF server, the join request sent by the target AMA server, and adding, by the target AMF server, the target AMA server to a network node corresponding to the target AMF server; and for each AMF server in the at least one AMF server, calculating, by the target AMA server, a difference in time between a moment that the first detection information is sent to the AMF server and a moment that the first detection response returned by the AMF server is received, wherein selecting the target AMF server comprises:

selecting an AMF server with a minimum time difference as the target AMF server.

2. The method according to claim 1, wherein after receiving, by the at least one AMF server, the first detection information sent by the target AMA server, the method further comprising:

if the at least one AMF server and the target AMF server are located in a same network node or the target AMA server owns an external network protocol IP address, the at least one AMF server sends second detection information to the target AMA server;

receiving, by the target AMA server, the second detection information sent by the at least one AMF server, and sending, by the target AMA server, second detection response to the at least one AMF server; and selecting the target AMF server from the at least one AMF server comprises:
among the at least one AMF server corresponding to the received second detection information, selecting the target AMF server.

3. The method according to claim 1, further comprising:
receiving, by the target AMA server, a service process registration request sent by the service provider-side, the service process registration request carrying registration information, where the registration information includes at least a service identifier, a service port identifier, a service process identifier, and a service notification method; and
detecting, by the target AMA server based on the registration information, whether the service process registration request is valid, if yes, the service process registration request is allowed, and if not, registration error information is sent to the service provider-side.

4. The method according to claim 3, further comprising:
receiving, by the target AMA server, a service process cancellation request sent by the service provider-side, the service process cancellation request carries cancellation information, where the cancellation information includes at least a service identifier, a service port identifier, a service process identifier, and a service notification method; and
detecting, by the target AMA server based on the cancellation information, whether the service process cancellation request is valid, if yes, the service process cancellation request is allowed, and if not, cancellation error information is sent to the service provider-side.

5. The method according to claim 3, further comprising:
if a heartbeat signal of a target service process is not received in a preset period of time, cancelling, by the target AMA server, the target service process.

6. The method according to claim 3, further comprising:
receiving, by the target AMF server, a task request sent by the service requester-side, where the task request carries identification information of the target AMA server;
forwarding, by the target AMF server, the task request to the target AMA server;
determining, by the target AMA server based on a correspondence relationship between a pre-stored service identifier and a server port identifier, a target service port identifier corresponding to the target service identifier;
sending, by the target AMA server, the task request to the target service provider-side corresponding to the target service port identifier;
receiving, by the target AMA server, a task request feedback sent by the target service provider-side, and sending, by the target AMA server, the task request feedback to the target AMF server; and
receiving, by the target AMF server, the task request feedback sent by the target AMA server, and sending, by the target AMF server, the task request feedback to the service requester-side.

7. The method according to claim 6, wherein sending, by the target AMA server, the task request to the target service provider-side corresponding to the target service port identifier comprises:
determining, by the target AMA server based on the target service port identifier, the target service provider, and acquiring, by the target AMA server, a service notification method corresponding to the target service provider-side; and If the service notification method corresponding to the target service provider-side is network notification, sending, by the target AMA server, the task request to the target service provider-side; if the service notification method corresponding to the target service provider-side is file notification, storing, by the target AMA server, the task request, and sending, by the target AMA server, a storage address to the target service provider-side; if the service notification method corresponding to the target service provider-side is a file, storing, by the target AMA server, the task request.

8. A self-adaptive service management system, the system comprising a target AMA server, and at least one AMF server, and the at least one AMF server comprising a target AMF server, wherein the target AMA server is configured to:
based on pre-stored address information of at least one AMF server, send first detection information to the at least one AMF server;
receive the first detection information sent by the target AMA server, and return first detection response of the first detection information to the target AMA server;
receive the first detection response returned by the at least one AMF server, select the target AMF server from the at least one AMF server, and send a join request to the target AMF server;
receive the join request sent by the target AMA server, and add the target AMA server to a network node corresponding to the target AMF server; and
for each AMF server in the at least one AMF server, calculate a difference in time between a moment that the first detection information is sent to the AMF server and a moment that the first detection response returned by the AMF server is received, wherein the target AMF server is selected by selecting an AMF server with a minimum time difference as the target AMF server.

9. The system according to claim 8, wherein the at least one AMF server is further configured to:
if the at least one AMF server and the target AMF server are in the same network node or the target AMA server owns an external network IP address, send second detection information to the target AMA server;
the target AMA server is further configured to receive the second prove information sent by the at least one AMF server, and send second detection response to the at least one AMF server; and
the target AMA server is specifically configured to:
among at least one AMF server corresponding to the received second detection information, select the target AMF server.

10. The system according to claim 8, wherein the target AMA server is further configured to receive a service process registration request sent by the service provider-side, the service process registration request carrying registration information, and the registration information includes at least a service identifier, a service port identifier, a service process identifier, and a service notification method; and
the target AMA server is further configured to, based on the registration information, detect whether the service process registration request is valid, if yes, the service process registration request is allowed, and if not, registration error information is sent to the service provider-side.

11. The system according to claim 10, wherein the target AMA server is further configured to receive a service process cancellation request sent by the service provider-side, the service process cancellation request carries cancellation information, the cancellation information includes at least a service identifier, a service port identifier, a service process identifier, and a service notification method; and the target AMA server is further configured to, based on the cancellation information, detect whether the service process cancellation request is valid, if yes, the service process cancellation request is allowed, and if not, cancellation error information is sent to the service provider-side.

12. The system according to claim 10, wherein the target AMA server is further configured to, if a heartbeat signal of a target service process is not received in a preset period of time, cancel the target service process.

13. The system according to claim 10, wherein the target AMF server is further configured to receive a task request sent by the service requester-side, where the task request carries identification information of the target AMA server;

the target AMA server is further configured to forward the task request to the target AMA server;

the target AMA server is further configured to, based on a correspondence relationship between a pre-stored service identifier and a server port identifier, determine a target service port identifier corresponding to the target service identifier;

the target AMA server is further configured to send the task request to the target service provider-side corresponding to the target service port identifier;

the target AMA server is further configured to receive a task request feedback sent by the target service provider-side and send the task request feedback to the target AMF server; and the target AMA server is further configured to receive the task request feedback sent by the target AMA server and send the task request feedback to the service requester-side.

14. The system according to claim 13, wherein the target AMA server is specifically configured to:

determine the target service provider-side based on the target service port identifier, and acquire a service notification method corresponding to the target service provider-side; and if the service notification method corresponding to the target service provider-side is network notification, the task request is sent to the target service provider-side; if the service notification method corresponding to the target service provider-side is file notification, the task request is stored and a storage address is sent to the target service provider-side; if the service notification method corresponding to the target service provider-side is a file, the task request is stored.

\* \* \* \* \*